United States Patent [19]

Oye et al.

[11] Patent Number: 4,805,094
[45] Date of Patent: Feb. 14, 1989

[54] MULTI-CHANNEL MEMORY ACCESS CIRCUIT

[75] Inventors: Kevin J. Oye, Red Bank, N.J.; Enzo Paterno, Staten Island, N.Y.; Thomas L. Smith, Lincroft, N.J.

[73] Assignees: American Telephone & Telegraph Company, New York, N.Y.; AT&T Information Systems Inc., Morristown, N.J.

[21] Appl. No.: 901,004

[22] Filed: Aug. 27, 1986

[51] Int. Cl.⁴ .................................... G06F 12/06
[52] U.S. Cl. ........................................ 364/200
[58] Field of Search ................................. 365/189; 364/200 MS File, 900 MS File

[56] References Cited

U.S. PATENT DOCUMENTS

| | | | |
|---|---|---|---|
| 4,356,351 | 10/1982 | Shefler et al. | 179/1 B |
| 4,371,752 | 2/1983 | Matthews et al. | 179/7.1 TP |
| 4,389,720 | 6/1983 | Baxter et al. | 370/62 |
| 4,401,957 | 8/1983 | McKeighen et al. | 333/165 |
| 4,433,394 | 2/1984 | Torii et al. | 365/189 |
| 4,438,296 | 3/1984 | Smith | 179/6.10 |
| 4,446,336 | 5/1984 | Bethel et al. | 179/6.10 |
| 4,490,788 | 12/1984 | Rasmussen | 364/200 |
| 4,535,448 | 8/1985 | Baxter et al. | 370/85 |
| 4,549,047 | 10/1985 | Brian et al. | 179/18 B |
| 4,580,012 | 4/1986 | Matthews et al. | 179/18 B |
| 4,581,486 | 4/1986 | Matthews et al. | 179/18 B |
| 4,599,708 | 7/1986 | Schuster | 365/189 |
| 4,623,990 | 11/1986 | Allen et al. | 365/189 |

Primary Examiner—Gareth D. Shaw
Assistant Examiner—Rebecca L. Adams
Attorney, Agent, or Firm—David H. Tannenbaum

[57] ABSTRACT

In many situations, contiguous data is not stored at contiguous locations within a memory. This fact alone causes an increase in processor time for retrieval purposes or the intervention of a memory management unit of some type. The situation is compounded when large amounts of data must be obtained from the memory or stored in the memory in real time. This problem is addressed by arranging a dual ported memory between the main memory and the processor and transferring the desired data into the dual ported memory. A pair of buffers are then used for each channel having access to the memory. While one buffer is being read, the other is being loaded. This structure also allows multiple devices to access the single main memory substantially simultaneously.

17 Claims, 2 Drawing Sheets

MULTI-CHANNEL MEMORY ACCESS CIRCUIT

BACKGROUND OF THE INVENTION

This invention relates to memory access circuits and, more particularly, to such circuits which provide for fast, non-contiguous memory retrieval or recording from a single memory concurrently for a number of reading devices.

Traditionally, when there is a desire to access a memory array quickly, designers have either used very fast processors, which are expensive, or they have used hardware assist devices, called DMA's, which access the memory directly and at speeds faster than a processor. DMA's, though, are designed to access data stored contiguously in memory and not to access non-contiguous memory locations. Thus, for DMA's to be effective, data must be stored in memory in a particular manner, which is not always practical.

In addition, if each accessing device were to be operated independently, then each device would require its own DMA, adding expense to memory retrieval or storage process. An example of a memory usage where the data is not stored contiguously for each reading device is our concurrently filed, co-pending patent application Ser. No. 901,003, filed Aug. 27, 1986, which applications have a common assignee and which application is hereby incorporated by reference herein.

SUMMARY OF THE INVENTION

Our solution allows us to access a memory concurrently from several devices, even if the data in the memory is stored in non-contiguous locations, using an inexpensive processor and several standard logic devices.

In our particular embodiment, sixteen independent reading or writing devices (or output channels) can access the same memory array every 125 μsecs. Our concept relies on a dual-ported random access memory (RAM) of 512 bytes placed between the memory array and the sixteen devices that need to simultaneously, but independently, access the memory array. Using the dual-ported RAM, we then allocate two buffers for each of the sixteen devices. One buffer fills from the memory array or writes to the memory array via a first port while the other buffer transfers data from dual-ported RAM to the reading devices or from the writing devices to the dual-port memory via the second port. Thus, a continuous stream of data can be provided to the reading devices or stored from the writing devices.

Each buffer can hold m bytes of data (in our example, m=10). The memory array is thus arranged in such a manner so that data is stored in 10-byte contiguous sectors beginning with a byte of data having an address known to the main processor. The main processor can then give the starting address of each sector and ten bytes of data will be transferred to the dual-ported RAM. As will be seen, while the ten bytes of data, each of which comprises a so-called sub-message data segment, must be stored contiguously, the various sub-messages which comprise a given message can be stored at non-contiguous locations within the memory array. Therefore, during a given 125 μsec work cycle, the processor only needs to provide the starting address of the ten bytes of contiguous data to be transferred, a task that is considerably simpler than having to provide ten different addresses.

BRIEF DESCRIPTION OF THE DRAWINGS

These and other objects and features, together with the operation and utilization of the present invention, will be more apparent from the illustrative embodiment shown in conjunction with the drawings in which.

DETAILED DESCRIPTION

Figure 1:
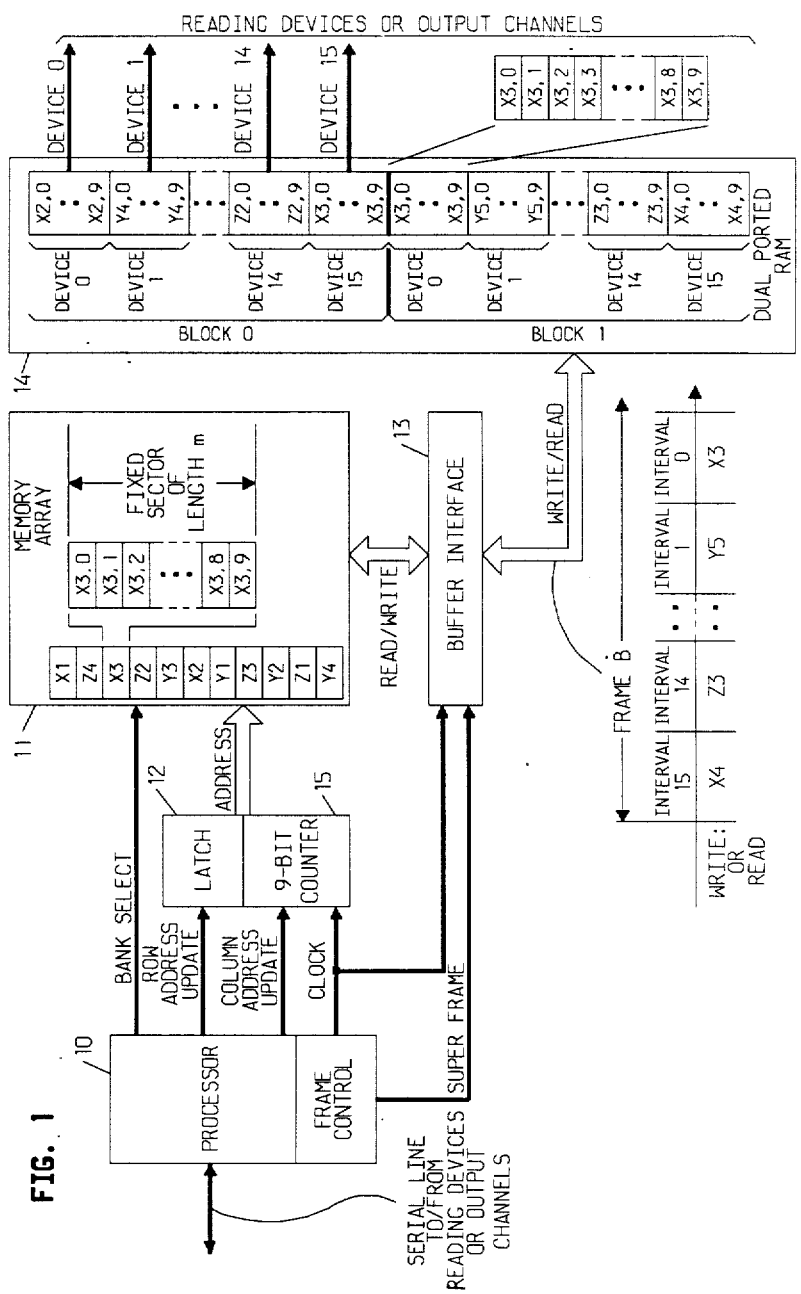
FIG. 1 is a detailed diagram of our invention.

FIG. 1 shows processor 10, which can be an Intel 8051 processor, used to manage accesses to 1M byte memory array 11. Processor 10 creates, in the well-known manner, a work cycle frame consisting of n 125 μsec control intervals, or periods, where n equals the number of reading devices (or output channels) concurrently able to obtain information from the memory array. Two such work frames are separated by a super frame signal.

In the example shown in FIG. 1 there are sixteen reading devices and, thus, n would be set to sixteen to have one control interval for each such device. Keep in mind, however, that if it were desired to connect a lesser number than n to the dual-ported RAM at any one time, n could be made smaller and a switch (not shown) could be added to selectively connect the proper number of output devices, or channels, to the dual-ported RAM. Also, it is a design choice as to the number of bytes of data strobed to each device on each frame. In our example we set m to ten (10).

Memory array 11 is arranged such that any message is sub-divided into sub-messages with each sub-message containing m data bytes (m being a number chosen by the system designer based upon time and capacity restraints). The address at which one data byte of each sub-message sits is known to processor 10 and the remaining data bytes of the sub-message are stored contiguously thereto. As discussed above and as will be seen, the sub-messages comprising a message need not be stored in contiguous locations in the memory array.

Sixteen reading devices (not shown) communicate with processor 10 across a serial interface. The reading devices provide processor 10 with the addresses of the memory sectors which contain the desired sub-messages. Alternatively, there can be provided (from the reading device or otherwise) a signal indicating which message is to be provided for which device and the processor, knowing all the sector addresses for each message, reads, sequentially, such addresses to memory array 11. Processor 10 then provides latch 12 the row address of the sector being accessed and, during the appropriate interval of a frame, 9-bit counter 15 strobes out the m consecutive column addresses (ten bytes in our example) accessed during that control interval. Processor 10 also provides the appropriate control signals to memory array 11, buffer interface 13 and dual-ported RAM 14 to initiate the transfer of data out of the memory array to the reading devices.

Digressing momentarily, the number m corresponds to the data transfer rate (DTR) between the memory array and the using device. The relationship is $$DTR \text{ (per device)} = m/(t \cdot d)$$

where t=period of work cycle and d=number of reading devices. Therefore, in our example where m=10, d=16 and t=125 μsec, the DTR is 5K bytes/s.

Returning now to our description, on the output side of memory array 11, buffer interface 13 transfers the data to the appropriate buffer in dual-ported RAM 14 as determined by the control interval within the frame that the data is obtained from memory array 11. Thus, data obtained during interval 0 is placed in buffer 0 while data obtained during interval 1 is placed in buffer 1. Ten bytes of information from memory array 11 are transferred during each cycle for each reading device into buffer interface 13 and that information is available to dual-ported RAM 14.

By way of example, let us assume that messages X, Y and Z were stored in memory array 11. Also, let us assume that each such message consists of a number of sub-messages (each containing m bytes) known as $X_1$, $X_2$, $X_3$, ... $X_n$ or $Y_1$, $Y_2$, $Y_3$, ... $Y_n$ or $Z_1$, $Z_2$, $Z_3$, ... $Z_n$. For our example, $X_{3,2}$ will indicate the second byte of the third sub-message of message X. This is shown pictorially in FIG. 1, memory array 11. Note that the sub-messages of each message are not stored contiguously, or even in numerical order. As discussed above, however, processor 10 has the capability of determining the location of each such sub-message in the proper order. In general, the sub-message size is a function of the number of output channels and usually would be an integral multiple thereof.

FIG. 1 shows a snapshot of data transfer occurring during one arbitrary control interval. Data is being read into dual-ported RAM 14, block 1, while data (previously stored) is being read out of block 0. It can be seen that reading device 0 is receiving message X, reading device 1 is receiving message Y, reading device 14 is receiving message Z and reading device 15 is also receiving message X. While data is being read from block 0, data is concurrently being written into block 1. It should be noted that, at any time, any number of the reading devices could be receiving the same byte of the same message or different bytes of the same message.

Figure 2:
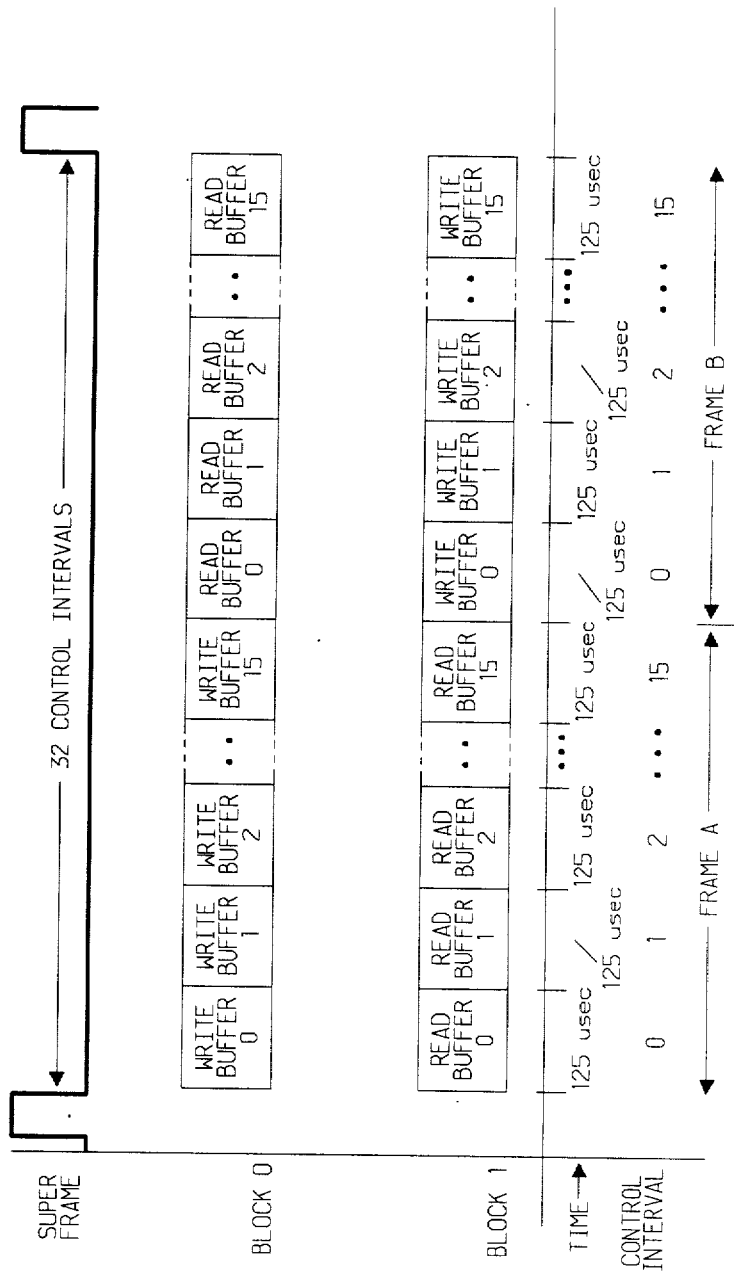
FIG. 2 shows a timing chart.

As shown in FIG. 2, during a given 125 μsec control interval, one buffer of dual-ported RAM 14 is read while another buffer is written into. Every 32 control intervals, or two frames, processor 10 begins a new super frame. Buffer interface circuit 13 uses the super frame signal to control the flow of information into dual-ported RAM 14.

For example, as shown in FIG. 1, assume that the sixteen read devices have been associated, on a one-for-one basis, with buffers 0–15 of a block. With the occurrence of the super frame signal, processor 10 begins with buffer 0 and loads up the starting address of the ten bytes of data for device 0 into the select leads of latch 12 and counter 15. In the example of FIG. 1, X1 would be the first sub-message of message X and X3 is the third sub-message of message X. Since counter 15 controls the lower nine bits of address, as it strokes out ten counts, it causes ten bytes (0–9) of data to flow out of memory array 11 (FIG. 1) and onto the data bus to interface 13. In the example shown in FIG. 1, data is being transferred during frame B and, thus, buffer interface 13 knows that the data is for block 1, device 0, in dual-ported RAM 14 where sub-message 3 of message X (X3) is being loaded into the buffer 0 of block 1, RAM 14, associated with device 0. After completing the 10-byte retrieval, processor 10 moves on in the next work cycle to process data for device 1, block 1.

With the completion of the loading of block 1 of dual-ported RAM 14, the reading and writing blocks are interchanged and the block that was loaded during the previous frame will now be accessible by the sixteen reading devices while the other block (block 0 in this case) will now be loaded with new data.

A similar example is possible where data comes from the device and is put into any available sectors in memory array, which sectors need not be contiguous. The only restriction which is different from the read operation is that several devices cannot write into the same sectors. Also, it should be noted that any combination of read channels and write channels can be simultaneously utilized.

CONCLUSION

While our memory retrieval system has been shown with sixteen reading or writing devices connected to sixteen buffers in each block of dual-ported RAM memory, it would be obvious to one skilled in the art to assign the devices, on an as-needed basis, to any segment of the RAM. Also, while it has been shown to control the reading or writing in blocks using the same control signal, this need not be the situation, and reading could occur sequentially just after the writing of the RAM thereby further reducing RAM size. These are design choices one skilled in the art could employ.

What is claimed is:

1. A circuit for retrieving data from a first memory for concurrent delivery to a plurality of output channels, said first memory being divided into addressable sectors each capable of storing m data elements, said circuit comprising means for defining periodic control intervals, each associated with a respective one of said output channels, means responsive to requests for data for delivery to a particular output channel for addressing certain of said sectors in said first memory during the control interval associated with said particular output channel, means operative during each said control interval for retrieving from said first memory a sector of m data elements stored in an individual one of said sectors, a second memory divided into buffers, each buffer being associated with a particular one of said output channels and with said control interval associated with said particular one of said output channels, each such buffer having storage capability for m data elements, means operative during each said control interval for transferring the retrieved m data elements from said first memory to said second memory and for storing said transferred data in said buffer associated with said control interval, and means for sequentially transferring data stored in each said buffer to said associated output channel.

2. The circuit set forth in claim 1 wherein said second memory is arranged with a pair of buffers associated with each said control interval, and wherein data which is transferred from said first memory is stored alternately in said paired buffers, and means for transferring data from a first one of said paired buffers to an output channel while data is being transferred into the other end of said paired buffers.

3. The circuit set forth in claim 1 wherein said addressing means is operative to address one sector in each said control interval.

4. The circuit set forth in claim 1 wherein said storing means and said means for transferring data to said output channels operate concurrently.

5. The circuit set forth in claim 4 wherein said second memory includes a dual-ported memory and wherein one of the two ports of said dual-ported memory is arranged to receive data for storage therein and the other of said ports is arranged to transfer data to said output channels.

6. The circuit set forth in claim 1 wherein said data elements are stored within said first memory in sectors, each sector having stored therein m data elements and each sector having a starting address and wherein a plurality of said sectors are required to make up a message for delivery to a reading device, said first memory being arranged such that all of said addresses of the sectors of any one message are not necessarily contiguous.

7. The circuit set forth in claim 6 wherein said control intervals are arranged in repetitive frames, each frame having n said control intervals, where n equals the number of reading devices accessible to retrieve data from said first memory concurrently, and
wherein said circuit further includes a processor for controlling interactions between said reading devices and said first memory, said processor operable to transform a request for data for delivery to a particular reading device into a plurality of sector addresses each said address provided to said first memory during the same relative control interval in repetitive ones of said frames.

8. The circuit set forth in claim 1 wherein data elements stored within said first memory for subsequent delivery to a particular output channel need not be stored at contiguous address locations.

9. The circuit set forth in claim 1 wherein said first memory to second memory transferring and storing means includes means for storing identical data elements in each of a plurality of buffers within said second memory.

10. A system for retrieving data messages from a first memory in which each such message is sub-divided into sub-messages, each sub-message having m data elements stored in said first memory at contiguous locations therein, each sub-message further being stored in a sector of said first memory having a starting address and the sectors not being contiguous, said system comprising
means for supplying retrieved messages concurrently to a plurality n of output channels,
means for assembling the starting addresses for the sectors of a message to be delivered to any said channel at a particular time,
means for defining frames of control intervals, each such frame containing n such control intervals, each such control interval in repetitive ones of said frames being associated with one of said n output channels,
means operative during each repetitive control interval associated with a particular output channel for providing to said first memory any assembled ones of said addresses for said particular output channel,
a second memory divided into n buffers, each buffer being associated with a particular one of said output channels and with said control interval associated with said particular output channels, each said buffer having storage capability for a sub-message from said first memory,
means responsive to said providing means and operable during each said control interval for storing a sub-message of data elements from said first memory in said buffer of said second memory associated with said control interval, and
means operative during each said control interval for transferring to said output channel associated with said control interval the data element associated with said output channel.

11. The system set forth in claim 10 wherein said second memory is arranged with a pair of buffers associated with each said control interval and wherein data which is transferred from said first memory is stored alternately in said paired buffers, and
means for transferring data from a first one of said paired buffers to an output channel while data is being transferred into the other one of said paired buffers.

12. A system for retrieving data messages from, or storing messages in, a first memory in which each such message is sub-divided into sub-messages, each sub-message having m data elements stored in said first memory at contiguous locations therein, each sub-message further being stored in a sector of said first memory having a starting address, and the sectors not being contiguous, said system comprising
means for supplying retrieved messages concurrently to, or for receiving messages concurrently from, a plurality of n channels,
means for assembling the starting addresses for the sectors of a message to be delivered to or received from any said channel at a particular time,
means for defining frames of control intervals, each such frame containing n such control intervals, each such control interval in repetitive ones of said frames being associated with one of said n channels,
means operative during each repetitive control interval associated with a particular channel for providing to said first memory any assembled ones of said addresses for said particular channel,
a second memory divided into n buffers, each buffer being associated with a particular one of said channels and with said control interval associated with said particular channels, each said buffer having storage capability for a sub-message stored or retrieved from said first memory,
means responsive to said providing means and operable during each said control interval for retrieving a sub-message from said first memory and storing the sub-message in the buffer of said second memory associated with said control interval or retrieving a sub-message from the buffer of said second memory associated with said control interval and storing the sub-message in said first memory, and
means operative during each said control interval for transferring from said second memory to said channel associated with said control interval or transferring from said channel associated with said control interval to said second memory the data element associated with said channel.

13. The system set forth in claim 12 wherein said second memory is arranged with a pair of buffers associated with each said control interval and wherein data which is transferred to or from said first memory is stored alternately in said paired buffers, and
means for transferring data from a first one of said paired buffers to said channel while data is being transferred into the other one of said paired buffers from said first memory or for transferring data to a first one of said paired buffers from said channel while data is being transferred out of the other one of said paired buffers into said first memory.

14. A circuit operative for handling data to or from a first memory for concurrent delivery from or to a plurality of channels, said first memory being divided into addressable sectors each capable of storing m data elements, said circuit comprising means for defining periodic control intervals, each associated with a respective one of said channels, means responsive to requests for data for delivery from or to a particular channel for addressing certain of said sectors in said first memory during the control interval associated with said particular channel, means operative during each said control interval for removing m data elements being stored in an individual one of said sectors from said first memory or removing m data elements to be stored in associated sectors in said first memory from said channels, a second memory divided into buffers, each buffer being associated with a particular one of said channels and with said control interval associated with said particular one of said channels, each such buffer having storage capability for m data elements, means operative during each said control interval for transferring the removed m data elements from said first memory or from said channels to said second memory and for storing said transferred data in said buffer associated with said control interval, and means for sequentially transferring data which is stored in each said buffer from said first memory to said associated channel or for sequentially transferring data which is stored in each said buffer from said channels to said associated sectors in said first memory.

15. The circuit set forth in claim 14 wherein said second memory is arranged with a pair of buffers associated with each said control interval and wherein data which is transferred to said second memory is stored alternately in said paired buffers, and means for transferring data from a first one of said paired buffers while data is being transferred into the other one of said paired buffers.

16. A circuit for removing data from an input channel for concurrent delivery to a first memory, said first memory being divided into addressable sectors each capable of storing m data elements, said circuit comprising means for defining periodic control intervals, each associated with a respective one of said input channels, means responsive to requests for data for delivery to said first memory from a particular input channel for addressing certain of said sectors in said first memory during the control interval associated with said particular input channel, means operative during each said control interval for removing m data elements to be stored in associated sectors in said first memory from said input channels, a second memory divided into buffers, each buffer being associated with a particular one of said input channels and with said control interval associated with said particular one of said input channels, each such buffer having storage capability for m data elements, means operative during each said control interval for transferring the removed m data elements from said input channels to said second memory and for storing said transferred data in said buffer associated with said control interval, and means for sequentially transferring data stored in each said buffer to said associated sectors in said first memory.

17. The circuit set forth in claim 16 wherein said second memory is arranged with a pair of buffers associated with each said control interval and wherein data which is transferred to said second memory is stored alternately in said paired buffers, and means for transferring data from a first one of said paired buffers while data is being transferred into the other one of said paired buffers.

* * * * *